(12) United States Patent
Nambara

(10) Patent No.: US 11,169,375 B2
(45) Date of Patent: Nov. 9, 2021

(54) LIGHTING UNIT AND HEAD-UP DISPLAY DEVICE

(71) Applicant: DENSO CORPORATION, Kariya (JP)

(72) Inventor: Takahiro Nambara, Kariya (JP)

(73) Assignee: DENSO CORPORATION, Kariya (JP)

( * ) Notice: Subject to any disclaimer, the term of this patent is extended or adjusted under 35 U.S.C. 154(b) by 336 days.

(21) Appl. No.: 16/269,605

(22) Filed: Feb. 7, 2019

(65) Prior Publication Data

US 2019/0171010 A1 Jun. 6, 2019

Related U.S. Application Data

(63) Continuation of application No. PCT/JP2017/023906, filed on Jun. 29, 2017.

(30) Foreign Application Priority Data

Aug. 11, 2016 (JP) .............................. JP2016-158318

(51) Int. Cl.
*G03B 21/20* (2006.01)
*G02B 27/01* (2006.01)
(Continued)

(52) U.S. Cl.
CPC .......... *G02B 27/0101* (2013.01); *B60K 35/00* (2013.01); *F21S 2/00* (2013.01);
(Continued)

(58) Field of Classification Search
CPC .. G03B 21/142; G03B 21/145; G03B 21/208; G03B 21/2013; G03B 21/2033;
(Continued)

(56) References Cited

U.S. PATENT DOCUMENTS

| 2011/0075434 A1* | 3/2011 | Kurokawa | ......... G02B 27/0101 |
| | | | 362/459 |
| 2013/0100974 A1* | 4/2013 | Janssens | ............ G02B 27/0961 |
| | | | 372/35 |

(Continued)

FOREIGN PATENT DOCUMENTS

| CN | 103292217 A | 9/2013 |
| JP | 2001250986 A | 9/2001 |

(Continued)

*Primary Examiner* — Sultan Chowdhury
(74) *Attorney, Agent, or Firm* — Harness, Dickey & Pierce, P.L.C.

(57) ABSTRACT

A lighting unit includes a light source configured to radiate a light, a circuit board on which the light source is mounted, and multiple stages of condenser lenses configured to condense the radiation light radiated from the light source. A first-stage lens that is located closest to the light source and given a maximum positive power among the multiple stages of condenser lenses has a partition wall portion and a positioning portion. The partition wall portion partitions an accommodation space in which the light source is accommodated in a range from a composite focal point of the multiple stages of condenser lenses to the first-stage lens by projection toward the circuit board side. The positioning portion 222 is provided on the partition wall portion and positioned relative to the circuit board by concavo-convex fitting.

11 Claims, 12 Drawing Sheets

(51) Int. Cl.
*B60K 35/00* (2006.01)
*F21V 5/04* (2006.01)
*F21S 2/00* (2016.01)
*F21V 17/00* (2006.01)
*G02B 19/00* (2006.01)

(52) U.S. Cl.
CPC ............... *F21V 5/04* (2013.01); *F21V 17/00* (2013.01); *G02B 19/0061* (2013.01); *G02B 27/01* (2013.01); *G03B 21/2033* (2013.01); *B60K 2370/334* (2019.05); *G02B 2027/013* (2013.01)

(58) Field of Classification Search
CPC ............... G02B 27/0062; G02B 27/01; G02B 27/0101; G02B 19/00; G02B 19/0004; G02B 19/0009; G02B 19/0014; G02B 19/0023; G02B 19/0047; G02B 19/0052; G02B 19/0057; G02B 19/0061; G02B 19/0066; F21S 2/00; F21S 2/005; F21V 5/04; F21V 5/041

See application file for complete search history.

(56) References Cited

U.S. PATENT DOCUMENTS

| | | | |
|---|---|---|---|
| 2013/0170204 A1* | 7/2013 | Sasamuro | F21V 29/70 362/235 |
| 2017/0146798 A1 | 5/2017 | Nambara | |
| 2018/0136463 A1* | 5/2018 | Nambara | G02B 3/08 |

FOREIGN PATENT DOCUMENTS

| | | |
|---|---|---|
| JP | 2009255851 A | 11/2009 |
| JP | 2015232608 A | 12/2015 |
| JP | 2016075760 A | 5/2016 |

\* cited by examiner

LIGHTING UNIT AND HEAD-UP DISPLAY DEVICE

CROSS REFERENCE TO RELATED APPLICATIONS

The present application is a continuation application of International Patent Application No. PCT/JP2017/023906 filed on Jun. 29, 2017, which designated the United States and claims the benefit of priority from Japanese Patent Application No. 2016-158318 filed on Aug. 11, 2016. The entire disclosures of all of the above applications are incorporated herein by reference.

TECHNICAL FIELD

The present disclosure relates to a lighting unit and a head-up display device provided with the lighting unit.

BACKGROUND

A known head-up display device (hereinafter referred to as "HUD devices") is configured to project a display image to display a virtual image of the display image.

SUMMARY

A lighting unit includes a light source, a circuit board, and condenser lenses. The light source and the condenser lenses are mounted to the circuit board.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
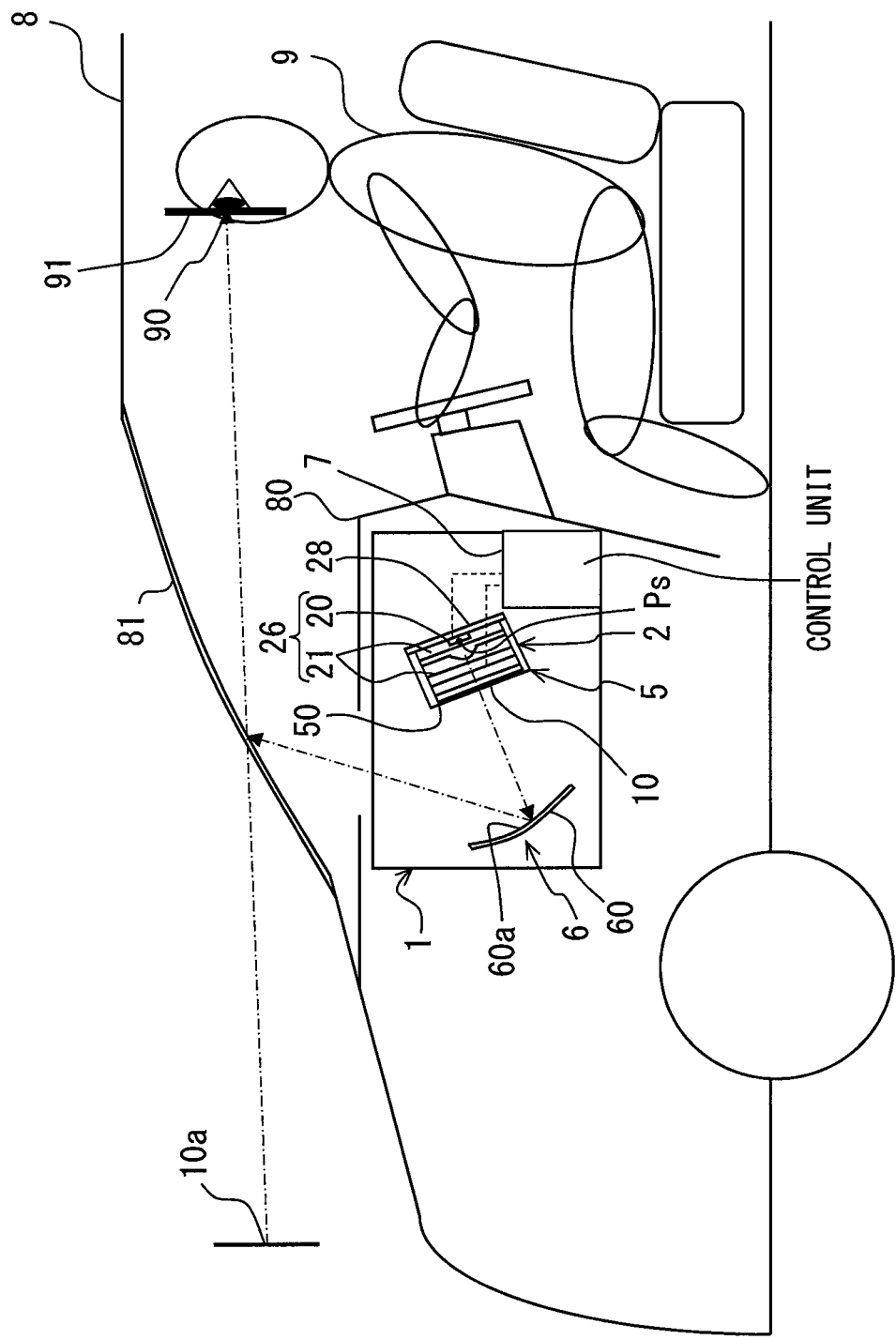
FIG. 1 is a configuration diagram showing an HUD device according to a first embodiment.

An example of a head-up display device is configured to project a display image formed by a display unit onto a projection member to display a virtual image of the display image in a visual recognition region in a viewable manner.

A conceivable HUD device includes a lighting unit suitable for illuminating a display image by transmissively lighting the display unit. The lighting unit may include multiple stages of condenser lenses for condensing a radiation light from the light source.

In a conceivable structure of the lighting unit, a maximum positive power may be given to a first-stage lens which is closest to a light source among the multiple stages of condenser lenses. In the conceivable structure, it is considered that a light condensing efficiency could be enhanced by placing a light source in a range from a composite focal point of the condenser lenses of the multiple stages to the first-stage lens having the maximum positive power.

It is further assumable, however, in a case where a relative position of the light source deviates greatly from an ideal predetermined position in design with respect to an optical axis of the first-stage lens described above, an illuminance unevenness or an illuminance reduction by the lighting unit would be particularly conspicuous. In the assumable case, an object to be lighted by the lighting unit would be the HUD device as described above. In such a case, the luminance unevenness or the luminance reduction tends is concerned to occur in the virtual image of the display image.

In consideration of the above issues, a lighting unit could have a structure configured to inhibit an illuminance unevenness and an illuminance reduction while enhancing a light condensing efficiency. In addition, an HUD device could have a structure configured to inhibit a luminance unevenness and a luminance reduction in a virtual image of a display image.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if they are not explicitly shown if there is no problem in the combination in particular.

First Embodiment

As shown in FIG. 1, an HUD device 1 according to a first embodiment of the present disclosure is mounted on a vehicle 8 as a moving object and housed inside an instrument panel 80. The HUD device 1 projects a display image 10 onto a windshield 81 which is a projection member of the vehicle 8. As a result, in an interior of the vehicle 8, a light of the display image 10 reflected by the windshield 81 reaches an eye point 90 of a viewer 9. The viewer 9 visually recognizes a virtual image 10a of the display image 10 in front of the windshield 81 by perceiving the light reaching the eye point 90. At this time, the visibility of the virtual image 10a is limited to a case in which the eye point 90 is located in a predetermined visual recognition region 91 of the interior of the vehicle 8. In other words, when the eye point 90 falls outside the visual recognition region 91, it is difficult for the viewer 9 to visually recognize the virtual image 10a.

The HUD device 1 includes a lighting unit 2, a display unit 5, a magnifying optical system 6, and a control unit 7.

Figure 2:
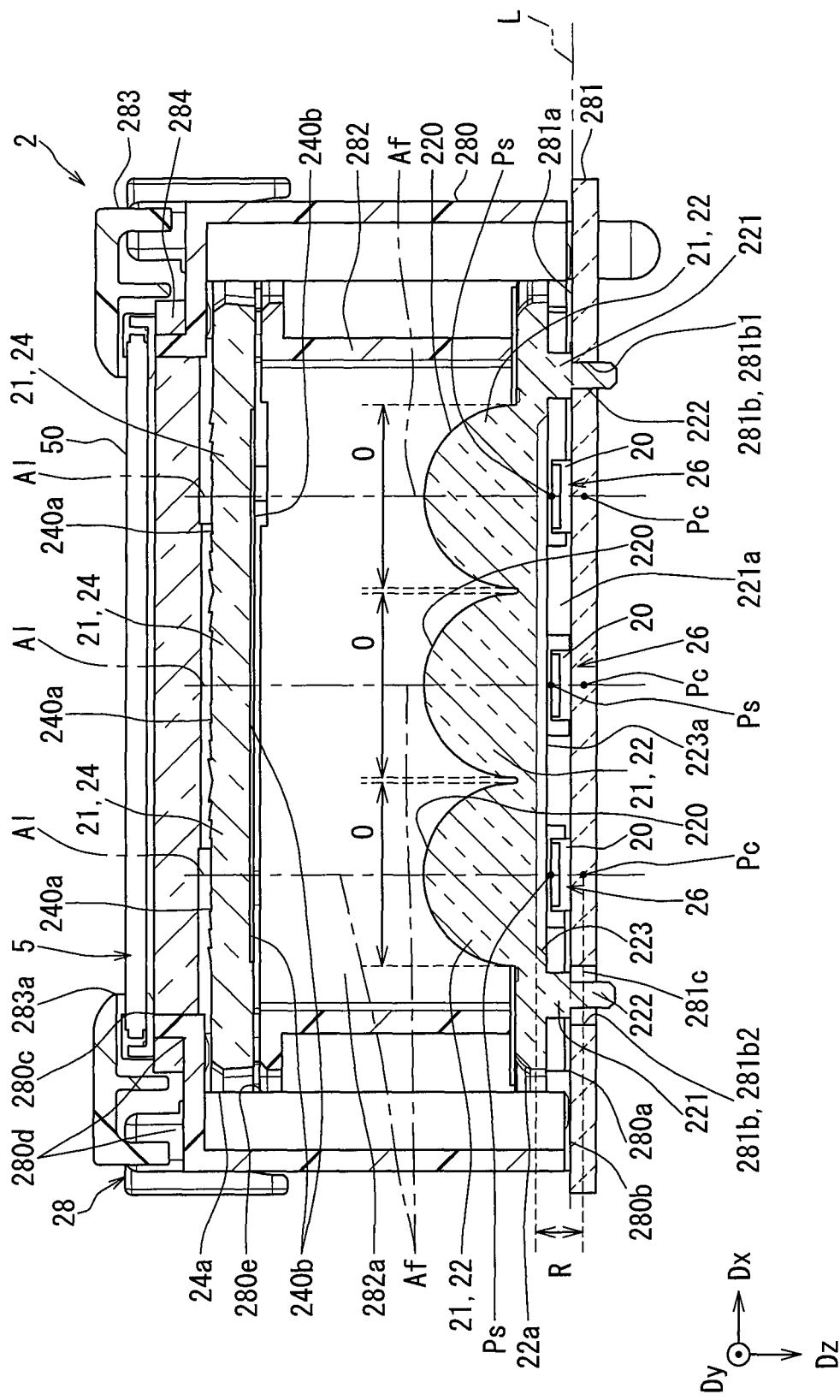
FIG. 2 is a cross-sectional view showing a lighting unit of the HUD device according to the first embodiment.

The lighting unit 2 is provided with a lighting casing 28 as shown in FIGS. 1 and 2. As shown in FIG. 2, the lighting casing 28 includes a casing main body 280, a circuit board 281, a spacer 282, a diffusion plate 284, and an emission cover 283.

The casing main body 280 is made of a light non-transmissive material such as resin and formed in a hollow substantially rectangular cylindrical shape. The circuit board 281 is formed in a substantially rectangular plate-like shape and made of a printed board material such as ceramics.

The circuit board 281 covers one opening 280a by being fitted and fixed to an outer peripheral portion 280b surrounding the opening 280a of the casing main body 280.

The spacer 282 is made of a light non-transmissive material such as resin and formed in a hollow substantially rectangular cylindrical shape. The spacer 282 is accommodated inside the casing main body 280 and surrounds an optical path space 282a.

The diffusion plate 284 is made of a light transmissive material such as resin or glass and formed in a substantially rectangular plate-shape. The diffusion plate 284 is fitted and fixed to an outer peripheral portion 280d surrounding the other opening 280c of the casing main body 280, thereby covering the opening 280d. The diffusion plate 284 is provided with a function of diffusing a light by, for example, forming minute irregularities or adding a diffusing agent.

The emission cover 283 is made of a light non-transmissive material such as resin and formed in a substantially rectangular frame shape. The emission cover 283 forms an emission port 283a for emitting the light. The emission cover 283 is fitted and fixed to the outer peripheral portion 280d of the casing main body 280.

As shown in FIGS. 1 and 2, in the lighting unit 2, one light source 20 and multiple stages of condenser lenses 21 are used as one lighting set 26, and multiple lighting sets 26 are further provided. In the first embodiment, as shown in FIG. 2, each of three sets of lighting set 26 includes a first-stage lens 22 and a rear-stage lens 24 as condenser lenses 21 corresponding to two stages for each light source 20. In other words, the lighting unit 2 according to the first embodiment includes the light sources 20, the first-stage lenses 22, and the rear-stage lenses 24, three by three, which are equal in number to each other.

The light source 20 in each lighting set 26 is a point-like light emitting source such as a light emitting diode (LED), for example, and is mounted on a mounting surface 281a of the circuit board 281 on the casing main body 280 side. As a result, in each lighting set 26, the light source 20 is located at a conjugate position Ps conjugate to the visual recognition region 91 across the magnifying optical system 6, as shown in FIGS. 1 and 2, in the interior of the casing main body 280. In each lighting set 26, the light source 20 emits the light in accordance with energization to radiate a light such as a white light.

Figure 3:
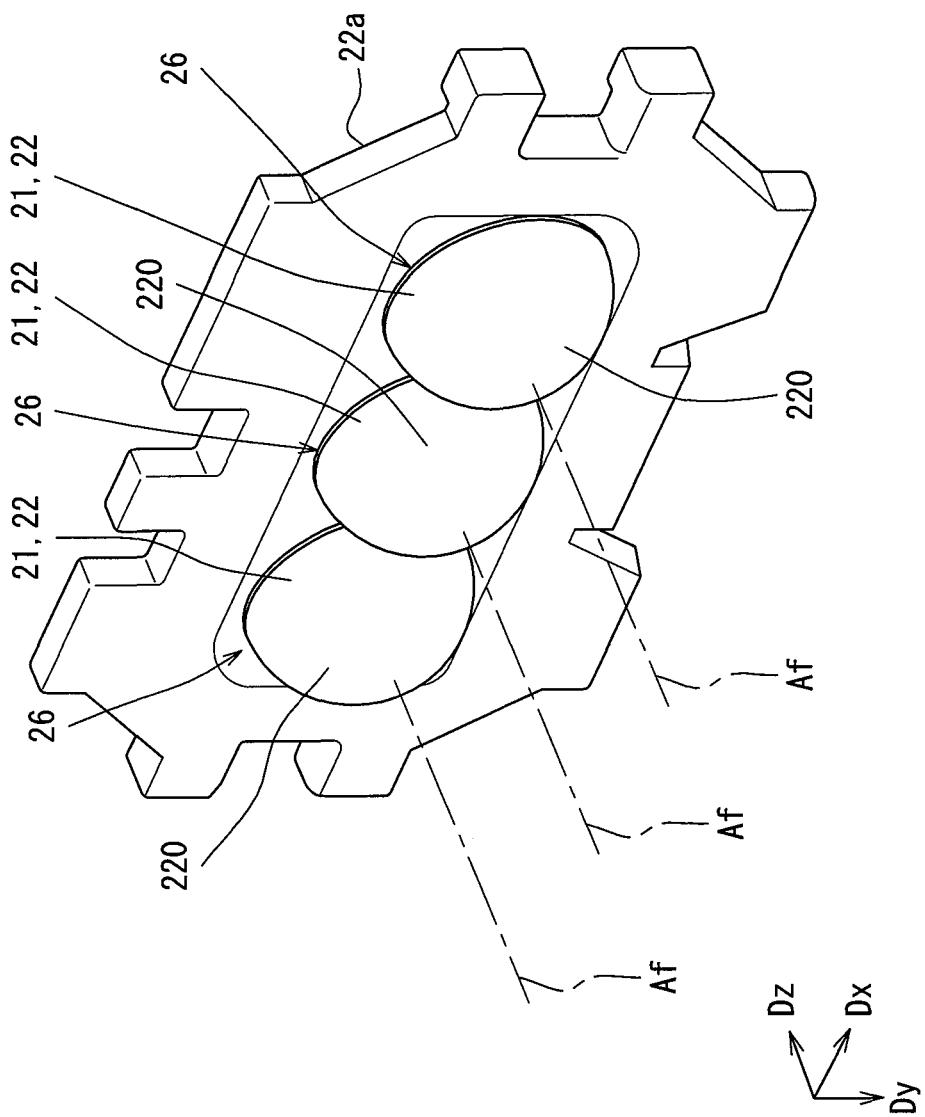
FIG. 3 is a perspective view showing a first-stage lens array of FIG. 2.

In each lighting set 26, the first-stage lens 22 is a condenser lens 21 located closest to the light source 20 of the same lighting set 26, as shown in FIGS. 2 and 3. The first-stage lens 22 in each lighting set 26 are provided with a maximum positive power in the condenser lenses 21 of the same set by individually forming a first-stage lens surface 220. In this example, the first-stage lens surface 220 according to the first embodiment is a convex lens surface provided on an optical axis Af of the first-stage lens 22 on the opposite side of the light source 20 of the same set.

The first-stage lenses 22 of the respective lighting sets 26 are integrally formed with a light transmissive material such as resin or glass, thereby forming a substantially hexagonal plate-shape first-stage lens array 22a as an overall. In other words, the first-stage lenses 22 of the respective lighting sets 26 are integrated into a lens array. As shown in FIG. 2, the first-stage lens array 22a is fitted and fixed to the circuit board 281. At the same time, the first-stage lens array 22a is sandwiched between the circuit board 281 and the spacer 282.

In each lighting set 26, the rear-stage lens 24 is a condenser lens 21 which is placed farther from the light source 20 of the same set than the first-stage lens 22 of the same set. The rear-stage lens 24 in each lighting set 26 substantially coincides with the first-stage lens 22 of the same set with the optical axes Af and Al. The rear-stage lens 24 in each lighting set 26 is provided with a positive power smaller than that of the first-stage lens 22 of the same set by individually forming a pair of rear-stage lens surfaces 240a and 240b.

Figure 4:
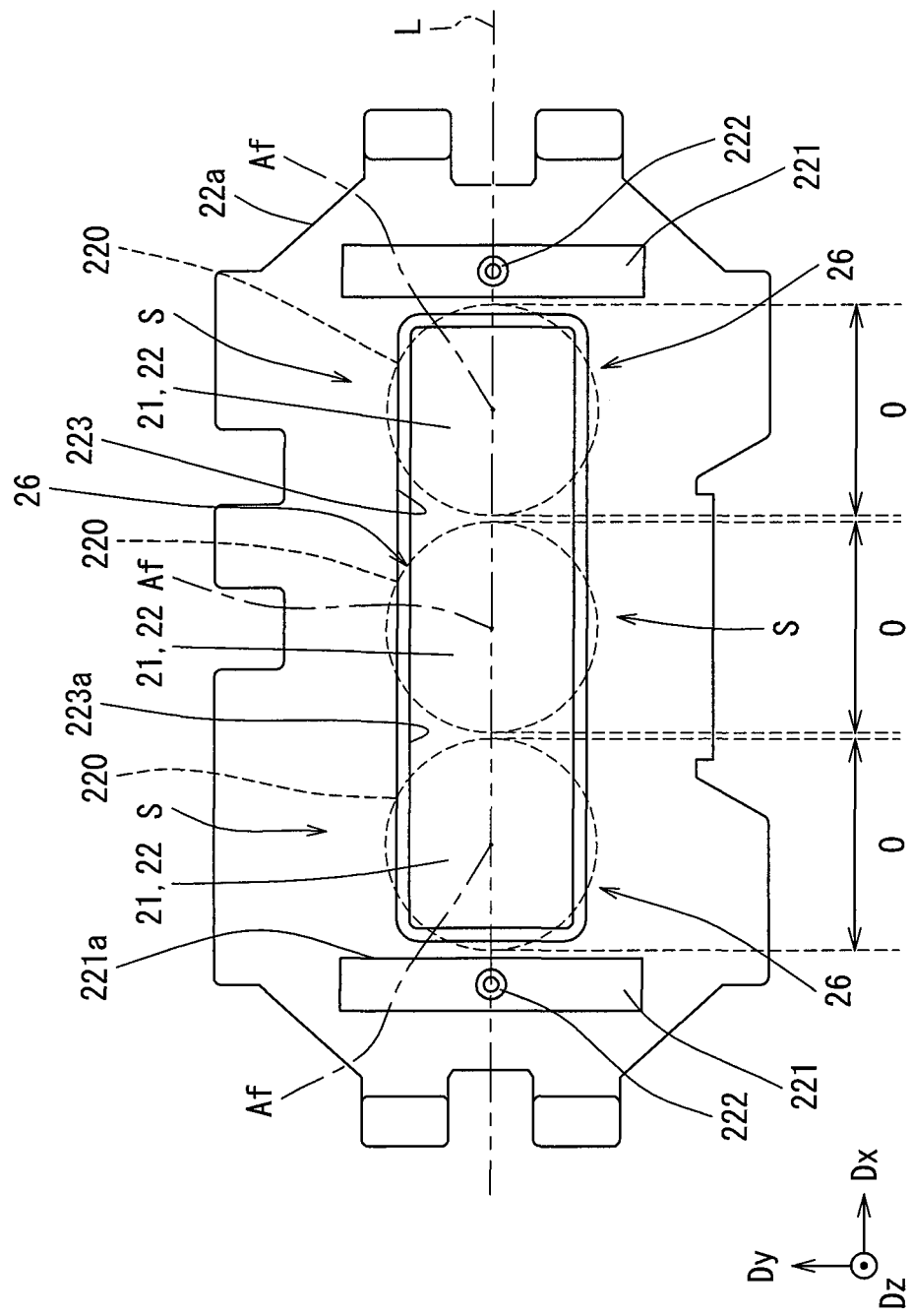
FIG. 4 is a plan view showing the first-stage lens array of FIG. 2.

In this example, one rear-stage lens surface 240a is a Fresnel lens surface provided on the optical axis Al of the rear-stage lens 24 on the side opposite to the first-stage lens 22 of the same set and divided in one reference direction Dx along the mounting surface 281a of the circuit board 281. At the same time, the other rear-stage lens surface 240b is a Fresnel lens surface provided on the optical axis Al of the rear-stage lens 24 on the first-stage lens 22 side of the same set and divided in another reference direction Dy along the mounting surface 281a. As shown in FIGS. 2 to 4, the reference directions Dx and Dy are defined as two-dimensional directions perpendicular to each other.

As shown in FIG. 2, the rear-stage lenses 24 in the respective lighting sets 26 are integrally formed with a light transmissive material such as resin or glass, thereby forming a rear-stage lens array 24a having a substantially rectangular plate-shape as an overall. In other words, the rear-stage lenses 24 of the respective lighting sets 26 are integrated into a lens array. The rear-stage lens array 24a is fitted and fixed to an inner peripheral portion 280e of the casing main body 280. At the same time, the rear-stage lens array 24a is sandwiched between the outer peripheral portion 280d of the casing main body 280 and the spacer 282.

With the configuration described above, in each lighting set 26, the first-stage lens 22 condenses the radiation light radiated from the light source 20 of the same set. Further, in each lighting set 26, the rear-stage lens 24 condenses the radiation light that has been condensed from the light source 20 of the set by the first-stage lens 22 of the same set and has passed through the common optical path space 282a. The radiation light condensed in each lighting set 26 is imaged on the visual recognition region 91 through the diffusion plate 284, the display unit 5, and the magnifying optical system 6 in sequence. At this time, in each lighting set 26, the rear-stage lens 24 adjusts an image forming position in the visual recognition region 91 with respect to the radiation light from the light source 20 of the same set.

The display unit 5 is, for example, an image display device such as a TFT liquid crystal panel or an organic EL panel, and has a screen 50 as shown in FIGS. 1 and 2. As shown in FIG. 2, the display unit 5 is sandwiched between the outer peripheral portion 280d of the casing main body 280 and the diffusion plate 284, and the emission cover 283 inside the lighting casing 28, thereby exposing the screen 50 to the outside of the lighting casing 28 through the emission port 283a. The display unit 5 forms a monochrome image or a color image as the display image 10 on the screen 50.

The screen 50 of the display unit 5 is transmissively lighted by receiving the radiation light condensed from the light source 20 through the first-stage lens 22 and the rear-stage lens 24 in each lighting set 26 from the side opposite to the emission port 283a. In this example, in the screen 50, the light receiving areas receiving the light by the respective lighting sets 26 are deviated from each other, so that transmitted lighting can be received over a wide area which is substantially the entire area of the screen 50. The display unit 5 receives the transmitted lighting and illuminates the display image 10 formed on the screen 50. The display image 10 is formed as a light image for displaying vehicle-related information such as a traveling speed and a traveling direction of the vehicle 8, and a warning of the vehicle 8.

As shown in FIG. 1, the magnifying optical system 6 mainly includes a single concave mirror 60, and is located outside the lighting casing 28. The concave mirror 60 is formed with a reflection surface 60a by evaporating a metal reflection film such as aluminum on a base material such as resin or glass. The concave mirror 60 reflects light incident from the screen 50 of the display unit 5 through the emission port 283a of the lighting casing 28 by the reflection surface 60a. As a result, the concave mirror 60 enlarges and projects the display image 10 illuminated on the screen 50, onto the windshield 81, so that the virtual image 10a of the display image 10 is displayed in the visual recognition region 91 so as to be visible. Therefore, the visual recognition region 91 is a region determined in accordance with a posture of the concave mirror 60.

The posture of the concave mirror 60 may be changed so as to change the position of the visual recognition region 91, or the posture of the concave mirror 60 may be fixed so as to keep the position of the visual recognition region 91 unchanged. The magnifying optical system 6 may materialize magnifying projection of the display image 10 by the multiple concave mirrors 60, or may materialize the display image 10 by a reflecting mirror or a lens other than the concave mirror 60.

The control unit 7 is formed mainly of a microcomputer, and is located outside or inside the lighting casing 28. The control unit 7 is electrically connected to the light source 20 and the display unit 5 in each lighting set 26. Further, the control unit 7 is communicably connected to, for example, other control units and various sensors of the vehicle 8. The control unit 7 controls the energization of the light source 20 in each lighting set 26 according to the vehicle related information, thereby causing the light source 20 to emit the light. At the same time, the control unit 7 controls the formation of the display image 10 on the screen 50 of the display unit 5 according to the vehicle related information, thereby realizing the display of the virtual image 10a to the viewer 9.

(Detailed Structure of Lighting Unit)

Next, a detailed structure of the lighting unit 2 according to the first embodiment will be described.

As shown in FIG. 2, the multiple lighting sets 26 are aligned along a virtual straight line L substantially parallel to the mounting surface 281a of the circuit board 281. In this example, the virtual straight line L is also substantially parallel to the screen 50 of the display unit 5 in the first embodiment.

Specifically, on the mounting surface 281a, the light sources 20 of the respective lighting sets 26 are aligned at substantially equal pitches so as to be spaced at predetermined intervals in the reference direction Dx along the virtual straight line L. The light source 20 of each lighting set 26 is placed on the optical axis Af of the first-stage lens surface 220 provided on the first-stage lens 22 of the same set. At the same time, the light source 20 of each lighting set 26 is placed in the range R from the composite focal point Pc of the composite lens to the first-stage lens 22 of the same set when a composite lens in which the first-stage lens 22 and the rear-stage lens 24 are optically combined together is assumed as the condenser lens 21 of the same set.

As shown in FIGS. 2 to 4, the first-stage lenses 22 of the respective lighting sets 26 are aligned at substantially equal pitches so as to be continuous in the reference direction Dx in the first-stage lens array 22a. As shown in FIGS. 2 and 4, in the first-stage lens array 22a, the first-stage lenses 22 of the respective lighting sets 26 share partition wall portions 221, positioning portions 222, and a recess portion 223.

In the first-stage lens array 22a, the partition wall portions 221 are provided separately one by one on both sides of the first-stage lenses 22 of all the lighting sets 26 on the virtual straight line L. As a result, in the first-stage lens array 22a, the partition wall portions 221 are placed at positions outside of all of optical regions O in which the first-stage lens surfaces 220 are provided in the first-stage lenses 22 of the respective lighting sets 26.

In the first-stage lens array 22a, the partition wall portions 221 protrude in the reference direction Dx and the vertical direction Dz relative to the mounting surface 281a toward the circuit board 281 that is the light source 20 side of each lighting set 26. As a result, each partition wall portion 221 partitions the accommodation space 221a for accommodating all the light sources 20 of the respective lighting sets 26 within the range R described above. In this example, according to the first embodiment in which the partition wall portions 221 are provided so as to sandwich the first-stage lenses 22 of all the lighting sets 26, as shown in FIG. 4, the accommodation space 221a is opened at side portions S of the light source 20 in each lighting set 26.

As illustrated in FIGS. 2 and 4, in the first-stage lens array 22a, the positioning portions 222 are provided on the respective partition wall portions 221 one by one on both sides of the first-stage lenses 22 of all the lighting sets 26 on the virtual straight line L. As a result, in the first-stage lens array 22a, the respective positioning portions 222 are also placed at positions outside all of the optical regions O in the first-stage lenses 22 of the respective lighting sets 26.

In the first-stage lens array 22a, each positioning portion 222 protrudes from the corresponding partition wall portion 221 in the vertical direction Dz toward the circuit board 281 side. Each of the positioning portions 222 is fitted into a corresponding one of a pair of holes 281b opened at least in the mounting surface 281a of the circuit board 281 in a concavo-convex fitting manner. As a result, each positioning portion 222 positioned to the circuit board 281 positions the first-stage lenses 22 of all the lighting sets 26 in the first-stage lens array 22a with respect to the circuit board 281.

In this example, as shown in FIG. 2, one hole 281b1 in the first embodiment is formed in a through circular hole shape penetrating through the circuit board 281 from the mounting surface 281a to the opposite surface, so that the entire region in the axial direction and the entire region in the circumferential direction of the hole 281b1 are externally fitted with the corresponding columnar positioning portion 222. On the other hand, the other hole 281b2 in the first embodiment is formed in the shape of a through long hole penetrating through the circuit board 281 from the mounting surface 281a to the opposite surface, so that the entire region in the axial direction and a part of the region in the circumferential direction of the hole 281b2 are externally fitted with the corresponding columnar positioning portion 222. In such an external fitting structure, a manufacturing tolerance of the first-stage lens array 22a and the circuit board 281 can be absorbed in the reference direction Dx by the gap 281c generated between the hole 281b2 having a long hole shape and the columnar positioning portion 222.

As shown in FIGS. 2 and 4, in the first-stage lens array 22a, one recess portion 223 is provided across the first-stage lenses 22 of all the lighting sets 26. The recess portion 223 opens in the first-stage lens array 22a toward the side opposite to the first-stage lens surface 220 of each set lighting set 26. As a result, the recess portion 223 internally provides an auxiliary space 223a communicating with the accommodation space 221a. In this example, the formation range of the auxiliary space 223a by the recess portion 223 is set to a range narrower than that of the accommodation space 221a. Further, in the first embodiment, the light sources 20 of the respective lighting sets 26 are located outside the recess portion 223 and are not accommodated in the auxiliary space 223a.

(Operational Effects)

The operation and effects of the first embodiment described above will be described below.

According to the lighting unit 2 of the first embodiment, the light source 20 is accommodated in the accommodation space 221a in the range R from the composite focal point Pc of the condenser lenses 21 to the first-stage lens 22 in the first-stage lens 22 which is closest to the light source 20 and is given the maximum positive power among the multiple stages of condenser lenses 21. As a result, in the lighting unit 2 in which the light condensing efficiency is enhanced, the positioning portions 222 are provided on the partition wall portions 221 that partition the accommodation space 221a by projection toward the circuit board 281 side on which the light source 20 is mounted. According to the above configuration, since the positioning portions 222 are positioned with respect to the mounting board 281 of the light source 20 by the concavo-convex fitting, the relative position of the light source 20 with respect to the optical axis Af of the first-stage lens 22 is less likely to be deviated from the predetermined position. Therefore, the illuminance unevenness and the illuminance reduction can be inhibited by the lighting unit 2 while increasing the light condensing efficiency. In addition, in the HUD device 1 according to the first embodiment in which the display unit 5 is transmissively lighted by the lighting unit 2 in which the illuminance unevenness and the illuminance decrease are inhibited after the light condensing efficiency is increased in this way, the luminance unevenness and the luminance decrease can be inhibited in the virtual image 10a of the display image 10 that emits the light.

Further, according to the first-stage lens 22 of the first embodiment, at a position outside the optical region O that provides the maximum positive power, the positioning portions 222 are located and fitted to the mounting board 281 of the light sources 20 in a concavo-convex fitting manner. According to the above configuration, an influence of the distortion due to the concavo-convex fitting is hardly exerted on the optical region O in which the radiation light from the light source 20 is condensed by the maximum positive power. Therefore, a situation in which the relative position of the light source 20 with respect to the optical axis Af of the first-stage lens 22 deviates from a predetermined position due to such distortion is avoided, thereby being capable of contributing to inhibition of illuminance unevenness and illuminance reduction by the lighting unit 2.

Further, according to the first-stage lenses 22 of the first embodiment, since the partition wall portions 221 open the accommodation space 221a at the side portions S of the light source 20, a radiant heat from the light source 20 accommodated in the accommodation space 221a can be released. According to the above configuration, the distortion caused in the first-stage lens 22 by the radiation heat from the light source 20 can be reduced. Therefore, a situation in which the relative position of the light source 20 with respect to the optical axis Af of the first-stage lens 22 deviates from a predetermined position due to such distortion is avoided, thereby being capable of contributing to inhibition of illuminance unevenness and illuminance reduction by the lighting unit 2.

Further, according to the lighting unit 2 of the first embodiment, in the multiple lighting sets 26 aligned along the virtual straight line L with the light source 20 and the multiple stages condenser lenses 21 as one lighting set 26, the first-stage lenses 22 are integrated into a lens array to share the partition wall portions 221 and the positioning portions 222. According to the above configuration, the first-stage lenses 22 in the respective lighting sets 26 can be collectively positioned with respect to the mounting board 281 of the light sources 20 by the shared positioning portions 222 in a state in which the light sources 20 are accommodated in the accommodation space 221a partitioned by the shared partition wall portions 221. This makes it to easily adjust the relative position of the light source 20 with respect to the optical axis Af of the first-stage lens 22 to a predetermined position for each lighting set 26, thereby being capable of contributing to the inhibition of the illuminance unevenness and the illuminance reduction by the lighting unit 2.

In addition, according to the lighting unit 2 of the first embodiment, the positioning portions 222 shared by the first-stage lenses 22 in the multiple lighting sets 26 are provided on both sides sandwiching the lighting sets 26 on the virtual straight line L, and are fitted to the mounting board 281 of the light sources 20 in a concavo-convex fitting manner. According to the above configuration, the lens array 22a in which the first-stage lenses 22 in the respective lighting sets 26 are integrated together can be restricted by the mounting board 281 of the light sources 20 from rotating around the virtual straight line L and from rotating to the side inclined with respect to the virtual straight line L. Therefore, in each lighting set 26, a situation in which the relative position of the light source 20 with respect to the optical axis Af of the first-stage lens 22 deviates from an intended position at once due to such rotation is avoided, thereby being capable of contributing to the inhibition of the illuminance unevenness and the illuminance reduction by the lighting unit 2.

In addition, according to the lighting unit 2 of the first embodiment, in the multiple lighting sets 26, the first-stage lenses 22 can be separated as far as possible from the same set of light sources 20 facing the recess portion 223. According to the above configuration, distortion generated in the first-stage lens 22 due to the radiation heat from the light source 20 can be reduced. Therefore, a situation in which the relative position of the light source 20 with respect to the optical axis Af of the first-stage lens 22 deviates from a predetermined position due to such distortion is avoided, thereby being capable of contributing to inhibition of illuminance unevenness and illuminance reduction by the lighting unit 2. Moreover, according to the lighting unit 2 of the first embodiment, in the recess portion 223 shared by the first-stage lenses 22 of the respective lighting sets 26, an edge portion that diffracts the radiation light can be restricted from appearing at a position where the radiation light is incident from the light sources 20 of the lighting sets 26. Therefore, in each lighting set 26, a situation in which the illuminance unevenness is caused by the lighting unit 2 due to such diffraction can be inhibited.

In addition, according to the lighting unit 2 of the first embodiment, the display unit 5 is transmissively lighted by the radiation light from the light source 20 located at the conjugate position Ps conjugate to the visual recognition region 91 across the magnifying optical system 6 to emit a light of the display image 10. According to the above configuration, the radiation light radiated from the light source 20 for guiding the display image 10 to the visual recognition region 91 can be imaged in the visual recognition region 91. Therefore, a situation in which the relative position of the light source 20 with respect to the optical axis Af of the first-stage lens 22 deviates from an intended position can be avoided while promoting high efficiency of light condensing efficiency, thereby being capable of contributing to inhibition of the illuminance unevenness and the illuminance reduction by the lighting unit 2.

Second Embodiment

Figure 5:
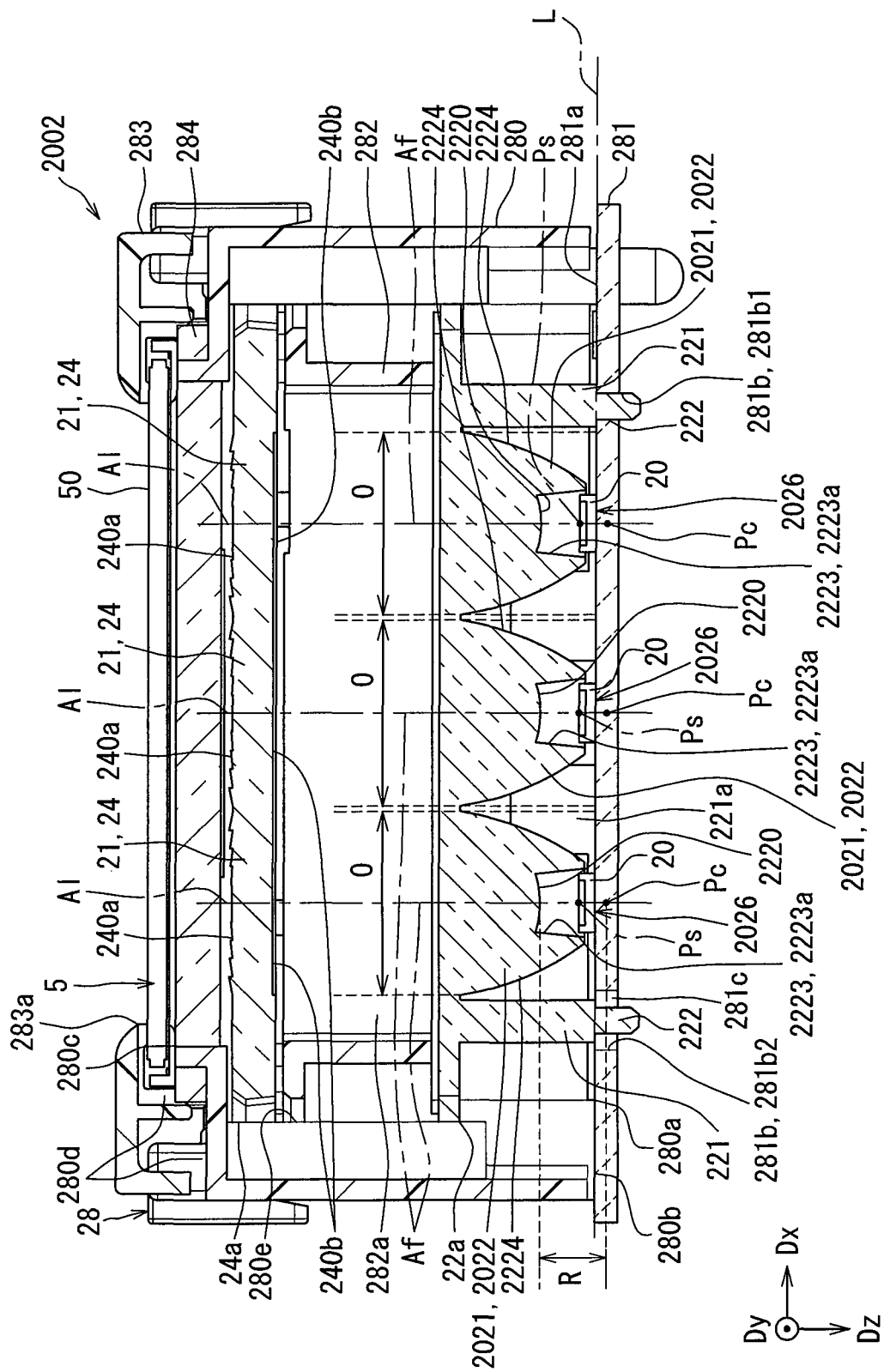
FIG. 5 is a cross-sectional view showing a lighting unit of an HUD device according to a second embodiment.
Figure 6:
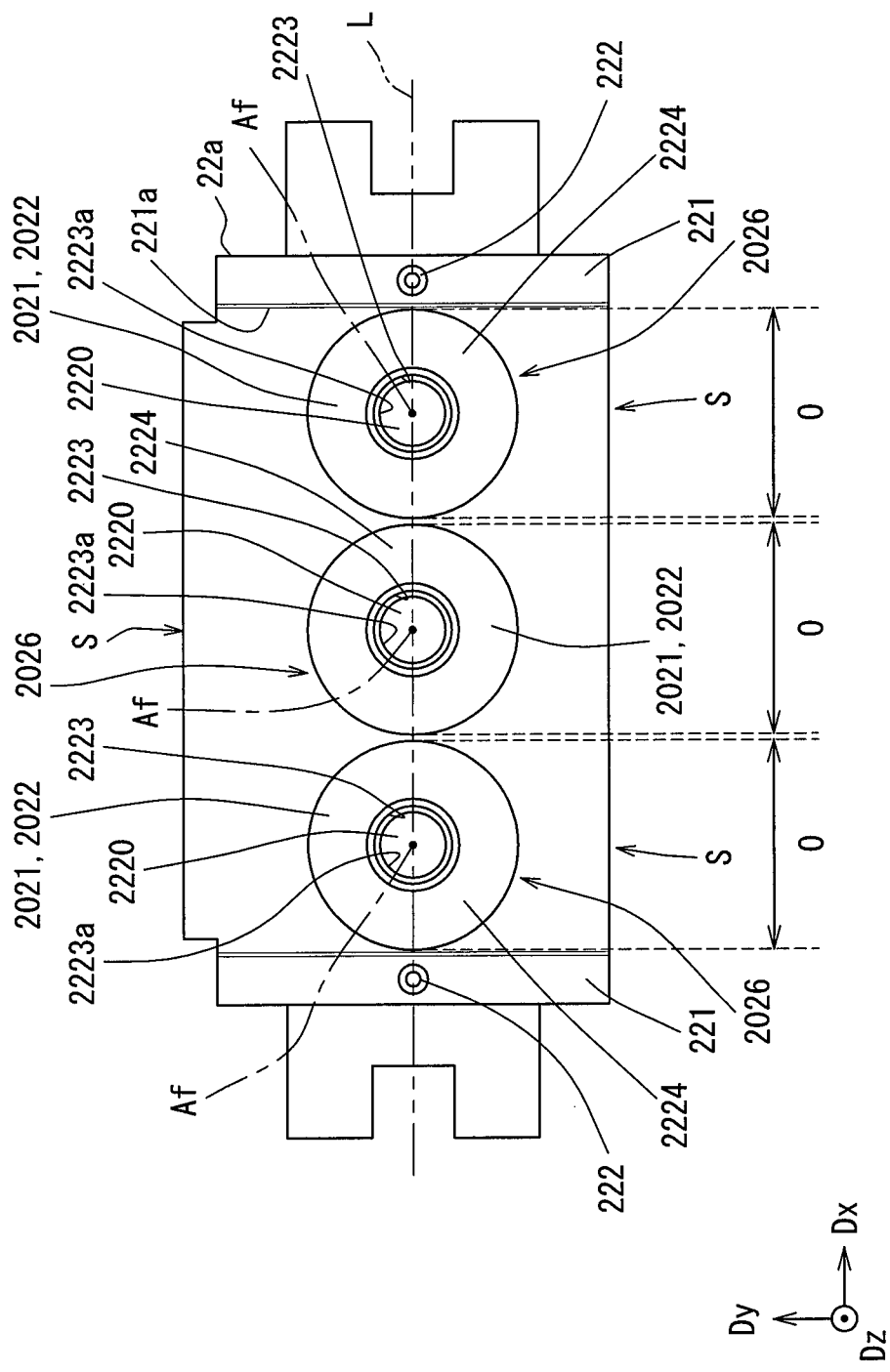
FIG. 6 is a plan view showing the first-stage lens array of FIG. 5.

As shown in FIGS. 5 and 6, a second embodiment of the present disclosure is a modification of the first embodiment. In a lighting unit 2002 according to the second embodiment, a configuration of a first-stage lens 2022 of condenser lenses 2021 in each lighting set 2026 is different from that of the first embodiment.

More specifically, the first-stage lens 2022 of each lighting set 2026 individually form a first-stage lens surface 2220 providing a maximum positive power among the condenser lenses 2021 of the same set on the light source 20 side of the same set, individually. At the same time, in the first-stage lens 2022 of each lighting set 2026, the first-stage lens surface 2220 is a concave bottom surface, and a recess portion 2223 for communicating an internal auxiliary space 2223a with an accommodation space 221a is individually provided on the light source 20 side of the same set.

Further, the first-stage lens 2022 of each lighting set 2026 individually form a total reflection surface 2224 provided in an optical region O together with the first-stage lens surface 2220 in a substantially tapered surface shape from the light source 20 side of the same set toward the opposite side. As a result, the first-stage lens 2022 of each set lighting set 2026 is a so-called TIR lens in the second embodiment. The configuration of the lighting unit 2002 according to the second embodiment is substantially the same as that of the lighting unit 2 of the first embodiment except for the configuration described above, and therefore a description of substantially the same configuration will be omitted.

According to the lighting unit 2002 of the second embodiment described above, in the first-stage lenses 2022 in the multiple lighting sets 2026, an incident area of a radiation light from the light source 20 of the same set accommodated in the individual recess portion 2223 can be ensured as large as possible. Therefore, a situation in which the relative position of the light source 20 with respect to the optical axis Af of the first-stage lens 22 in each lighting set 2026 deviates from an intended position can be avoided while promoting high efficiency of light condensing efficiency, thereby being capable of contributing to inhibition of the illuminance unevenness and the illuminance reduction by the lighting unit 2002.

Other Embodiments

Although a plurality of embodiments of the present disclosure have been described above, the present disclosure is not construed as being limited to these embodiments, and can be applied to various embodiments and combinations within a scope that does not deviate from the gist of the present disclosure. FIGS. 7 to 12 to be described later representatively show modifications involved in the first embodiment.

Figure 7:
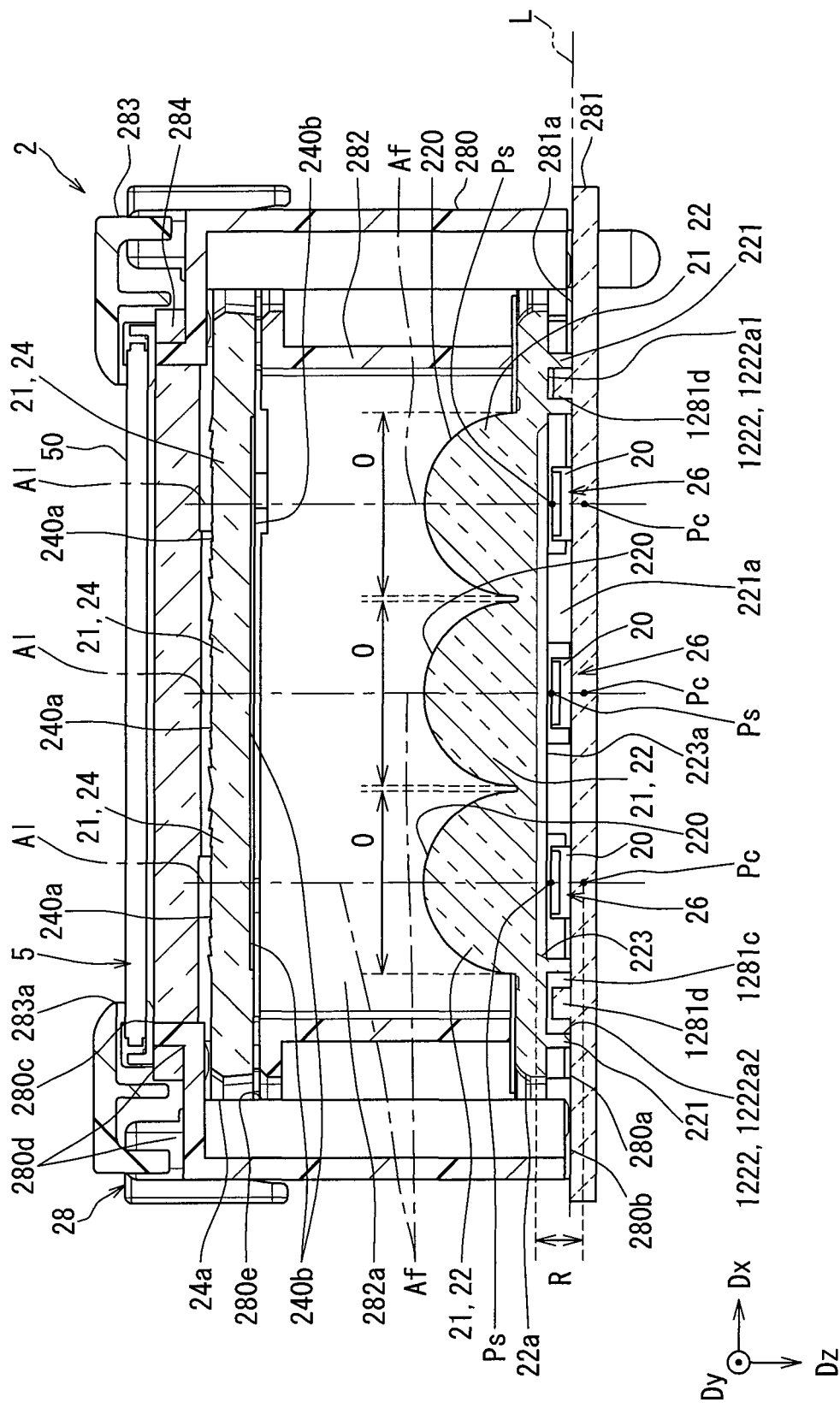
FIG. 7 is a cross-sectional view showing one modification of FIG. 2.

Specifically, in Modification 1 involved in the first and second embodiments, as shown in FIG. 7, the positioning portion 1222 may be provided in a hole shape opened toward at least the circuit board 281 side in each partition wall portion 221. In Modification 1 described above, each positioning portion 1222 is positioned with respect to the circuit board 281 by concavo-convexly fitting to a corresponding one of a pair of protrusion portions 1281d protruding from the mounting surface 281a toward each partition wall portion 221 side in the circuit board 281.

In this example, in Modification 1 of FIG. 7, one positioning portion 1222a1 is formed in the shape of a bottomed circular hole opened in a protruding side tip end face of the partition wall portion 221, so that the entire region in the axial direction and the entire region in the circumferential direction of the positioning portion 1222a1 are externally fitted to the corresponding columnar protrusion portion 1281d. On the contrary, in Modification 1 of FIG. 7, the other positioning portion 1222a2 is formed in the shape of a bottomed long hole opened in the protruding side tip end face of the partition wall portion 221, so that the entire region in the axial direction and a part of the region in the circumferential direction of the positioning portion 1222a2 are externally fitted to the corresponding columnar protrusion portion 1281d. In the external fitting structure described above, a manufacturing tolerance of the first-stage lens array 22a and the circuit board 281 can be absorbed in the reference direction Dx by a gap 1281c generated between the positioning portion 1222a2 having a long hole shape and the columnar protrusion portion 1281d.

Figure 8:
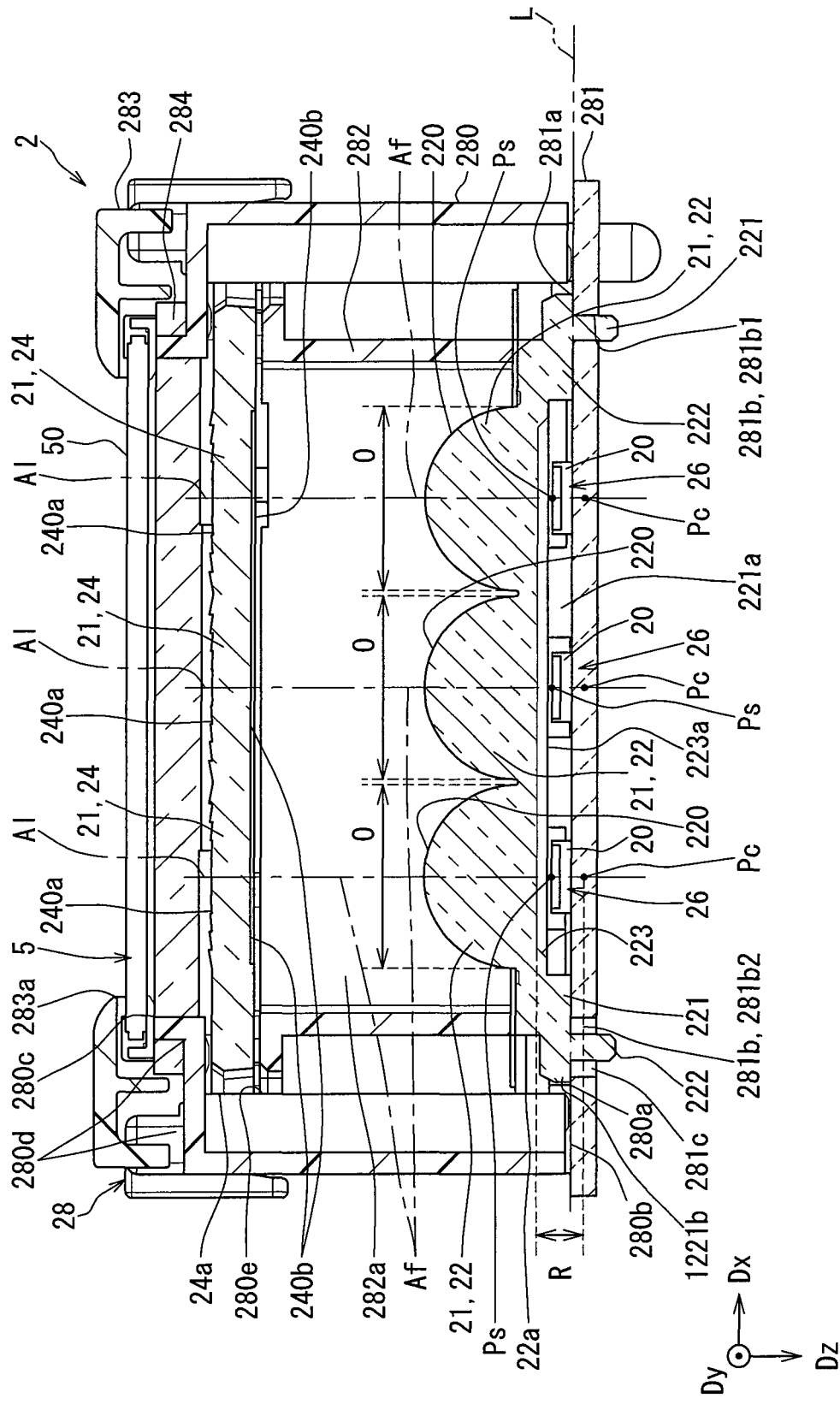
FIG. 8 is a cross-sectional view showing another modification of FIG. 2.
Figure 9:
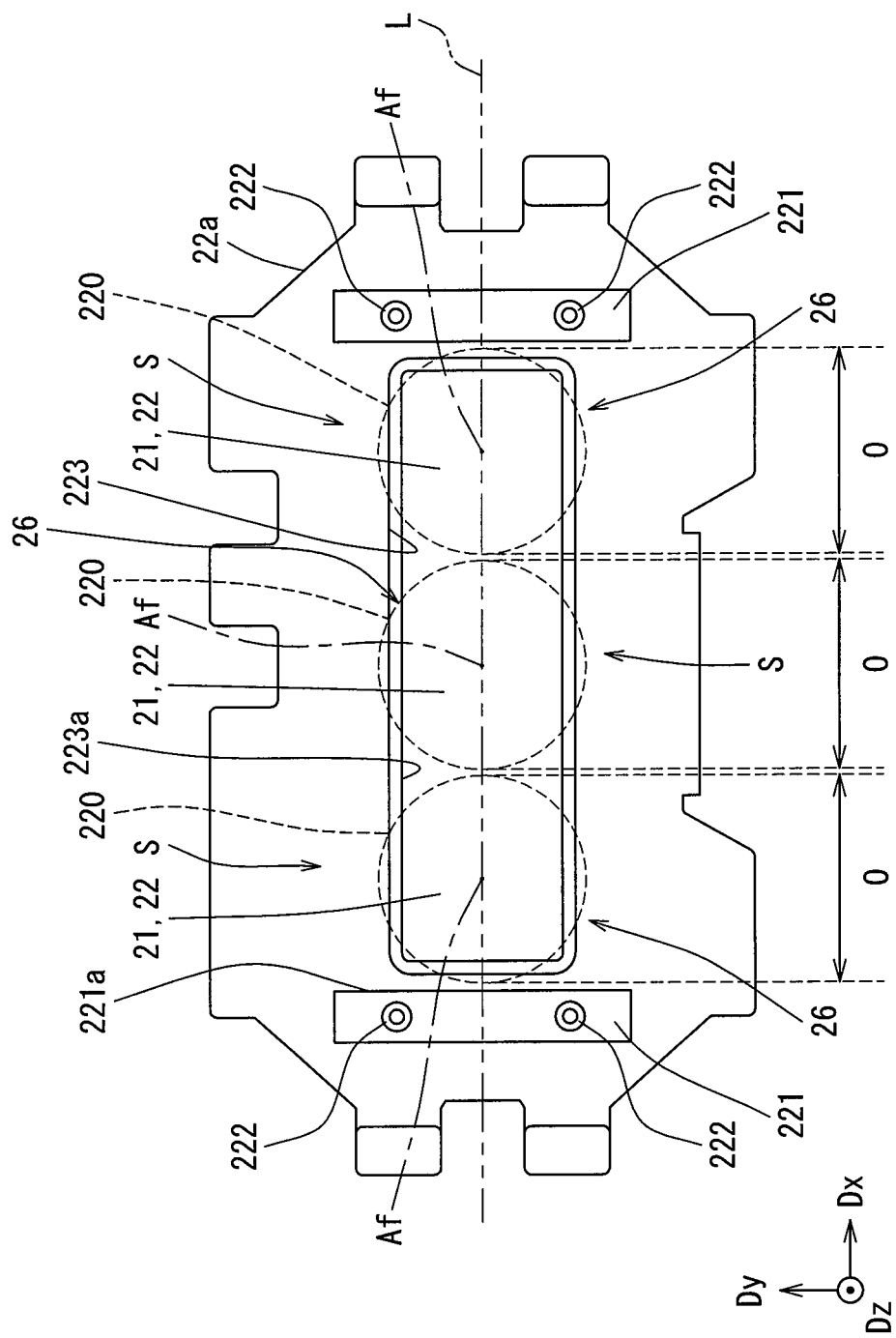
FIG. 9 is a cross-sectional view showing still another modification of FIG. 4.

In Modification 2 involved in the first and second embodiments, as shown in FIG. 8, the positioning portion 222 may be provided on a flange portion 1221b protruding in an outer flange shape in the partition wall portion 221. In Modification 3 involved in the first and second embodiments, as shown in FIG. 9, the positioning portion 222 may be provided at a position deviated from the virtual straight line L. In this example, in Modification 3 of FIG. 9, the positioning portions 222 are provided at substantially symmetrical positions on both sides of the virtual straight line L in each partition wall portion 221.

In Modification 4 involved in the first and second embodiments, the partition wall portion 221 and the positioning portion 222 may be located in the optical region O of the first-stage lenses 22 and 2022. In Modification 5 involved in the first and second embodiments, the partition wall portion 221 and the positioning portion 222 are individually provided for each of the first-stage lenses 22 and 2022 of the respective lighting sets 26 and 2026, and need not be shared by these first-stage lenses 22 and 2022.

Figure 10:
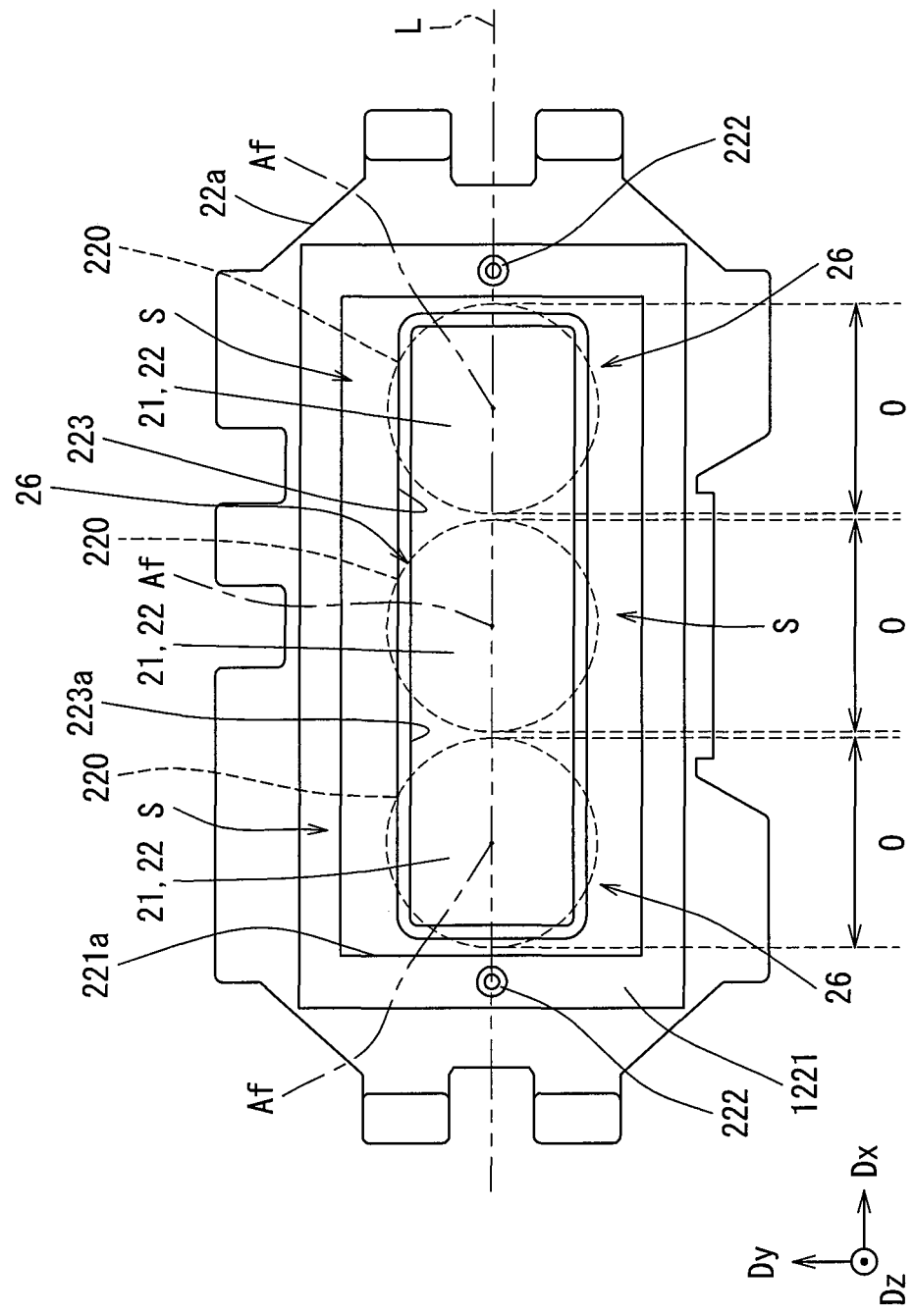
FIG. 10 is a cross-sectional view showing yet another modification of FIG. 4.

In Modification 6 involved in the first and second embodiments, as shown in FIG. 10, a partition wall portion 1221 may be provided in an annular form so as to surround the accommodation space 221a without opening at the side positions S of the light source 20 of each of the lighting sets 26 and 2026. In Modification 7 involved in the first and second embodiments, the light source 20 of each of the lighting sets 26 and 2026 may be located outside the conjugate position Ps conjugate to the visual recognition region 91 across the magnifying optical system 6.

Figure 11:
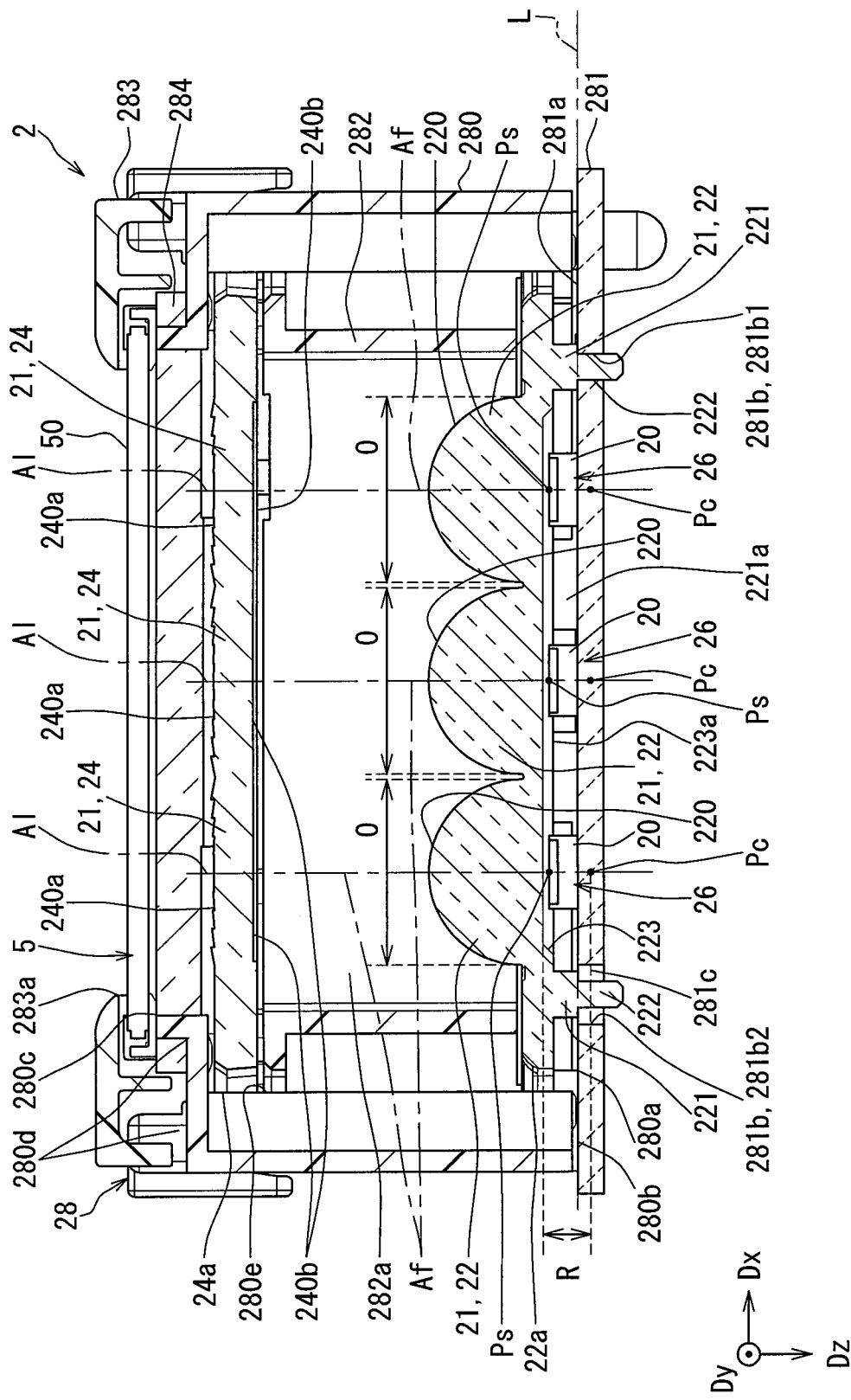
FIG. 11 is a cross-sectional view showing a modification of FIG. 2.
Figure 12:
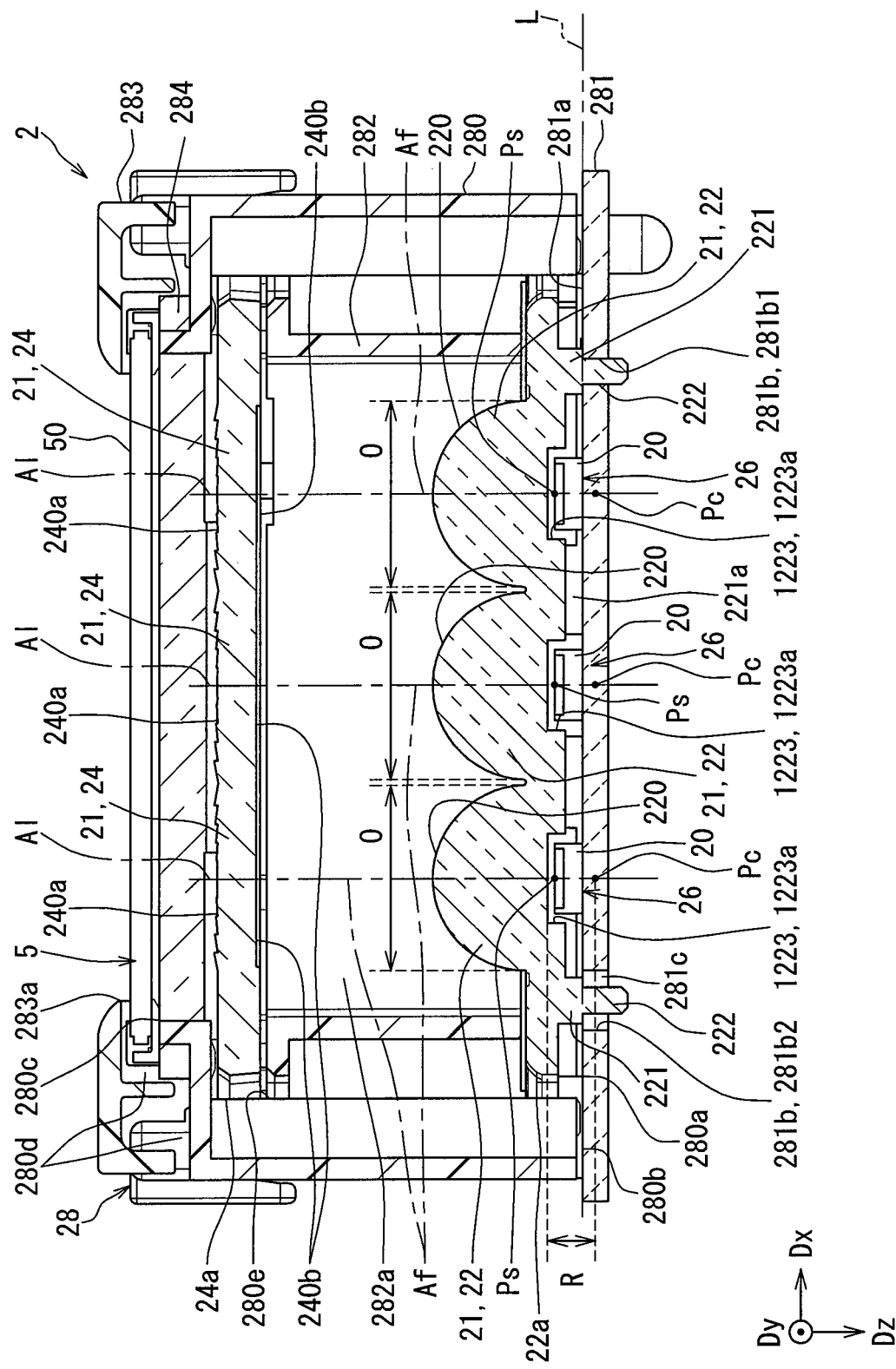
FIG. 12 is a cross-sectional view showing a further modification of FIG. 2.

In Modification 8 involved in the first embodiment, as shown in FIG. 11, the light sources 20 of the lighting sets 26 may be accommodated in the auxiliary space 223a inside the recess portion 223 shared by the first-stage lenses 22 of the respective lighting sets 26. In Modification 9 involved in the first embodiment, as shown in FIG. 12, the light source 20 of the lighting set 26 may be accommodated in the auxiliary space 1223a inside the recess portion 1223 individually provided in the first-stage lens 22 of each lighting set 26 according to the second embodiment.

In Modification 10 involved in the first and second embodiments, multiple lighting sets 26 and 2026 may be aligned along the virtual straight line L extending in each of the reference directions Dx and Dy. In Modification 11 involved in the first and second embodiments, the respective lighting sets 26 and 2026 may be aligned along the virtual straight line L inclined with respect to the screen 50 of the display unit 5.

In Modification 12 involved in the first and second embodiments, multiple rear-stage lenses 24 each having a positive power smaller than that of the first-stage lenses 22 and 2022 may be provided in the respective lighting set 26 and 2026. In Modification 13 involved in the first and second embodiments, a rear-stage lens surface of the rear-stage lens 24 of each of the lighting sets 26 and 2026 may be, for example, a Fresnel lens surface on only one side, a convex lens surface on both sides or only one side, or the like, other than the Fresnel lens surface on both sides.

In Modification 14 relating to the first and second embodiments, the same set of light sources 20 may be arranged in each set of lighting set 26 and 2026 so as to deviate from the optical axis Af of the first-stage lenses 22 and 2022 in the reference direction Dx. As a modification 15 involved in the first and second embodiments, an optical axis Al deviated from the optical axis Af of the first-stage lenses 22 and 2022 in the respective lighting sets 26 and 2026 in the reference direction Dx may be given to the rear-stage lens 24 of the same set.

In Modification 16 involved in the first and second embodiments, the number of lighting sets 26 and 2026 may be other than three. In other words, the lighting units 2 and 2002 may include the light sources 20, the first-stage lenses 22 and 2022, and the rear-stage lenses 24, respectively, in a number other than three.

In Modification 17 involved in the first and second embodiments, the projection member of the vehicle 8 may be an element other than the windshield 81, for example, a combiner mounted on an interior surface of the windshield 81 or formed separately from the windshield 81. In Modification 18 involved in the first and second embodiments, the present disclosure may be applied to the HUD device 1 mounted on a moving object such as a ship or an airplane other than the vehicle 8 and the lighting units 2 and 2002 for the HUD device 1.

The lighting units 2 and 2002 described above include the light source 20 for emitting the light, the circuit board 281 on which the light source is mounted, and the multiple stages of condenser lenses 21, 22, 24, 2021, and 2022 for condensing the radiation light from the light source. The first-stage lenses 22 and 2022 are closest to the light source and provided with the maximum positive power among the multiple stages of condenser lenses. The first-stage lenses 22 and 2022 have the wall portions 221 and 1221 and the positioning portions 222 and 1222. The partition wall portions 221 and 1221 partition the accommodation space 221a in which the light source is accommodated in the range R from the composite focal point Pc to the first-stage lens involved in the multiple stages of condenser lenses by projecting toward the circuit board side. The positioning portions 222 and 1222 are provided on the partition wall portions, and are positioned with respect to the circuit board by concavo-convex fitting.

According to the lighting unit of the first disclosure described above, in the first-stage lens which is closest to the light source and provided with the maximum positive power among the multiple stages of condenser lenses, the light source is accommodated in the accommodation space in the range from the composite focal point of the condenser lenses to the first-stage lens. As a result, in the lighting unit in which the light condensing efficiency is enhanced, the positioning portions are provided on the partition wall portions that partition the accommodation space by projection toward the circuit board side on which the light source is mounted. According to the above configuration, since the positioning portions are positioned with respect to the mounting board of the light source by the concavo-convex fitting, the relative position of the light source with respect to the optical axis Af of the first-stage lens is less likely to be deviated from the predetermined position. Therefore, the illuminance unevenness and the illuminance reduction can be inhibited by the lighting unit while increasing the light condensing efficiency.

The HUD device 1 described above projects the display image 10 formed by the display unit 5 onto the projection member 81, thereby visually displaying the virtual image 10a of the display image in the visual recognition region 91. The HUD device 1 includes the lighting units 2 and 2002 that transmissively light the display unit to emit a light from the display image. The lighting unit includes the light source 20 that radiates the light for transmissively lighting the display unit, the circuit board 281 on which the light source is mounted, and the multiple stages of condenser lenses 21, 22, 24, 2021, and 2022 that condense the radiation light radiated from the light source. Of the multiple condenser lenses, the first-stage lenses 22 and 2022, which are closest to the light source and are given the maximum positive power, have the partition wall portions 221 and 1221 and the positioning portions 222 and 1222. The partition wall portions 221 and 1221 partition the accommodation space 221a in which the light source is accommodated in the range R from the composite focal point Pc to the first-stage lens involved in the multiple stages of condenser lenses by projecting toward the circuit board side. The positioning portions 222 and 1222 are provided on the partition wall portions, and are positioned with respect to the circuit board by concavo-convex fitting.

As described above, according to the lighting unit provided in the HUD device of the second disclosure, in the first-stage lens which is closest to the light source and is given the maximum positive power among the multiple stages of condenser lenses, the light source is accommodated in the accommodation space in the range from the composite focal point of the condenser lenses to the first-stage lens. As a result, in the lighting unit in which the light condensing efficiency is enhanced, the positioning portions are provided on the partition wall portions that partition the accommodation space by projection toward the circuit board side on which the light source is mounted. According to the above configuration, since the positioning portions are positioned with respect to the mounting board of the light source by the concavo-convex fitting, the relative position of the light source with respect to the optical axis Af of the first-stage lens is less likely to be deviated from the predetermined position. Therefore, in the HUD device of the second disclosure in which the display unit is transmissively lighted by the lighting unit in which the illuminance unevenness and the illuminance decrease are inhibited after the light condensing efficiency is increased, the luminance unevenness and the luminance decrease can be inhibited in the virtual image of the display image which emits the light.

Although the present disclosure has been described in accordance with the examples, it is understood that the present disclosure is not limited to the above examples or structures. The present disclosure encompasses various modifications and variations within the scope of equivalents. In addition, various combinations and configurations, as well as other combinations and configurations that include only one element, more, or less, fall within the scope and spirit of the present disclosure.

The invention claimed is:

1. A lighting unit comprising:
a light source configured to radiate a light;
a circuit board on which the light source is mounted; and
a plurality of stages of condenser lenses configured to condense the light radiated from the light source, wherein
the plurality of stages of condenser lenses includes a first-stage lens located closest to the light source and having a maximum positive power among the plurality of stages of condenser lenses, and
the first-stage lens includes:
a partition wall portion partitioning an accommodation space, in which the light source is accommodated in a range from a composite focal point of the plurality of stages of condenser lenses to the first-stage lens, by a protrusion toward the circuit board; and
a positioning portion provided on the partition wall portion and positioned relative to the circuit board by concavo-convex fitting.

2. The lighting unit according to claim 1, wherein
the positioning portion is located at a position outside an optical region in which the first-stage lens is provided with the maximum positive power among the plurality of stages of condenser lenses.

3. The lighting unit according to claim 1, wherein
the partition wall portion opens the accommodation space at a side portion of the light source.

4. The lighting unit according to claim 1, wherein
the light source and the plurality of stages of condenser lenses form one lighting set,
a plurality of lighting sets are aligned along a virtual straight line, and
the first-stage lenses in the plurality of lighting sets are integrated in a lens array to share the partition wall portion and the positioning portion.

5. The lighting unit according to claim 4, wherein
the positioning portions are provided on both sides of the plurality of lighting sets on the virtual straight line.

6. The lighting unit according to claim 4, wherein
the first-stage lenses in the plurality of lighting sets share a recess portion facing the light sources respectively in the respective lighting sets.

7. The lighting unit according to claim 4, wherein
the first-stage lenses in the plurality of lighting sets individually provide recess portions respectively for accommodating the light sources respectively in the respective lighting set.

8. The lighting unit according to claim 1, wherein
in a head-up display device configured to project a display image formed by a display unit and enlarged by an enlargement optical system onto a projection member to visually display a virtual image of the display image in a visual recognition region, the lighting unit is configured to transmissively light the display unit by a radiation light from the light source located at a conjugate position conjugate with the visual recognition region across the magnifying optical system to illuminate the display image.

9. The lighting unit according to claim 1, wherein
one of the circuit board and the positioning portion has a fitting protrusion,
an other of the circuit board and the positioning portion has a fitting hole, and
the fitting protrusion and the fitting hole are fitted to each other and are positioned to each other.

10. A head-up display device configured to project a display image formed by a display unit onto a projection member to visually display a virtual image of the display image in a visual recognition region, the head-up display device comprising:
a lighting unit configured to transmissively light the display unit to illuminate the display image, wherein
the lighting unit includes:
a light source configured to radiate the light to transmissively light the display unit;
a circuit board on which the light source is mounted; and
a plurality of stages of condenser lenses configured to condense the light radiated from the light source, wherein
a first-stage lens among the plurality of stages of condenser lenses is located closest to the light source and has a maximum positive power among the plurality of stages of condenser lenses, and
the first-stage lens includes:
a partition wall portion partitioning an accommodation space, in which the light source is accommodated in a range from a composite focal point of the plurality of stages of condenser lenses to the first-stage lens, by a protrusion toward the circuit board; and
a positioning portion provided on the partition wall portion and positioned relative to the circuit board by concavo-convex fitting.

11. The head-up display device according to claim 10, wherein
one of the circuit board and the positioning portion has a fitting protrusion,
an other of the circuit board and the positioning portion has a fitting hole, and
the fitting protrusion and the fitting hole are fitted to each other and are positioned to each other.

* * * * *